US008091244B2

(12) United States Patent
Andrews et al.

(10) Patent No.: US 8,091,244 B2
(45) Date of Patent: Jan. 10, 2012

(54) HOLDING MECHANISM FOR USE WITH AN OPHTHALMIC TRACER, AND METHOD

(75) Inventors: Daniel E. Andrews, Charlottesville, VA (US); David W. Gerding, Barboursville, VA (US); Kurt W. Schaeffer, Waynesboro, VA (US)

(73) Assignee: National Optronics, Inc., Charlottesville, VA (US)

( * ) Notice: Subject to any disclaimer, the term of this patent is extended or adjusted under 35 U.S.C. 154(b) by 0 days.

(21) Appl. No.: 13/012,941

(22) Filed: Jan. 25, 2011

(65) Prior Publication Data
US 2011/0113639 A1 May 19, 2011

Related U.S. Application Data

(62) Division of application No. 12/027,002, filed on Feb. 6, 2008, now Pat. No. 7,874,079.

(60) Provisional application No. 60/899,652, filed on Feb. 6, 2007.

(51) Int. Cl.
*A61B 3/10* (2006.01)
*G01B 1/00* (2006.01)
(52) U.S. Cl. .................. 33/200; 33/507; 702/168
(58) Field of Classification Search .............. 33/28, 200, 33/507, 551, 553, 554, 555
See application file for complete search history.

(56) References Cited

U.S. PATENT DOCUMENTS

| 5,501,017 | A | * | 3/1996 | Suzuki | 33/200 |
| 5,594,992 | A | * | 1/1997 | Suzuki et al. | 33/200 |
| 6,154,969 | A | | 12/2000 | Abitbol et al. | |
| 6,671,973 | B2 | | 1/2004 | Takemura et al. | |
| 6,728,656 | B2 | * | 4/2004 | Suzuki | 702/168 |
| 6,745,616 | B1 | * | 6/2004 | Katayama et al. | 73/104 |
| 7,140,119 | B2 | | 11/2006 | Badami et al. | |
| 7,721,452 | B2 | * | 5/2010 | Koyama | 33/200 |
| 7,874,079 | B2 | * | 1/2011 | Andrews et al. | 33/507 |
| 2010/0018298 | A1 | * | 1/2010 | Kanematsu et al. | 73/104 |
| 2010/0094589 | A1 | * | 4/2010 | Tesseraud | 702/167 |

* cited by examiner

*Primary Examiner* — Amy Cohen Johnson
(74) *Attorney, Agent, or Firm* — Berenato & White, LLC

(57) ABSTRACT

The present invention relates to an ophthalmic holding mechanism for holding an eyeglass frame. The holding mechanism includes a base, a clamping mechanism configured for releaseably securing a lens mount of an eyeglass frame, and an actuator operatively associated with the clamping mechanism for causing linear and rotational movement thereof. The clamping mechanism is moveably coupled to the base for linear and rotational movement about an axis of rotation relative to the base, wherein the clamping mechanism is rotatable about first and second spaced pivot points. The present invention also relates to a method of tracing a lens mount of an eyeglass frame.

20 Claims, 15 Drawing Sheets ent and to which priority is claimed.

HOLDING MECHANISM FOR USE WITH AN OPHTHALMIC TRACER, AND METHOD

The present application is a divisional of application Ser. No. 12/027,002, filed Feb. 6, 2008, now U.S. Pat. No. 7,874,079, the disclosure of which is are incorporated by reference and to which priority is claimed.

CROSS REFERENCE TO RELATED APPLICATION AND CLAIM TO PRIORITY

This application is based on provisional application Ser. No. 60/899,652, filed Feb. 6, 2007, for Andrews et al., the disclosure of which is incorporated herein by reference and to which priority is claimed.

FIELD OF THE INVENTION

The present invention relates to an ophthalmic holding mechanism for holding an eyeglass frame. The holding mechanism includes a base, a clamping mechanism configured for releaseably securing a lens mount, and an actuator operatively associated with the clamping mechanism for causing linear and rotational movement thereof. The clamping mechanism is moveably coupled to the base for linear and rotational movement about an axis of rotation relative to the base, wherein the clamping mechanism is rotatable about first and second spaced pivot points. The present invention also relates to a method of tracing a lens mount.

BACKGROUND OF THE INVENTION

In the eyeglass industry, it is desirable to provide lenses having different shapes and sizes to accommodate different sizes and shapes of eyeglass frames. Generally, eyeglass lenses start out as lens blanks having certain optical properties designed to correct one or more defects in a patient's vision. The blanks are usually circular and of substantially larger dimension, for example 70 mm in diameter, compared to the relatively smaller finished lenses assembled into eyeglass frames. Lens blanks are routinely subjected to edge processing in an effort to adapt them to a selected size and shape of eyeglass frames.

Edge processing can be achieved using any one of several conventional techniques. According to one such technique, eyeglass frame manufacturers provide lens patterns that fit within the respective lens mounts of those manufacturers' eyeglass frames. When a patient selects a particular style and size of frame, a lens blank which has been formed to correct that particular patient's vision defect is placed in an edging apparatus along with the pattern or patterns provided by the frame manufacturer. The edging apparatus then traces the pattern and removes material from the periphery of the lens blank in accordance with the pattern.

Conventional pattern-based techniques have certain drawbacks associated with them. For example, a relatively large number of patterns must be provided, storage space is required for such patterns, and difficulties arise when the patterns become misplaced or when they are misaligned during tracing. Typically, one or more patterns must be provided for each different shape and/or size of eyeglass frame. The amount of storage space required for such patterns increases as the choices in eyeglass frame sizes and shapes expand. Therefore, while such conventional techniques may be adequate for some applications, there remains a need for a more convenient arrangement.

In order to provide a more convenient arrangement, efforts were made to eliminate or reduce the need for patterns by providing a tracing apparatus capable of tracing the lens mounts of eyeglass frames. The results of such tracings (i.e. trace data) then were used to provide edging information for use in edging a lens blank.

A conventional tracer typically includes a clamp assembly for clamping the frames in a fixed position, and an engager having a projecting surface for tracing the groove of the frames. Trace data is generated according to the position of the engager. The edger processes the edge of the lens blank to create an edge profile according to the trace data. Therefore, accurately tracing the groove of the frames ensures a proper fit of the lens within the frame opening.

Most conventional tracers are generally effective when the lens mounts in the eyeglass frames are substantially planar. However, many tracers encounter problems when tracing frames having a "high wrap". The term "high wrap" as used herein encompasses shapes that have a curvature greater than 6 diopters. Typically, though not necessarily, high wrap is provided so that the eyeglass frame more closely follows the contour of the wearer's face.

In particular, the engager that performs the tracing in many conventional tracers is generally biased in a radially outward direction to engage a groove in the lens opening or mount of the eyeglass frame. This radially outward biasing remains effective so long as the groove in the lens mount extends in the same radially outward direction. Eyeglass frames with high wrap, however, tend to have grooves in the high wrap region which extend obliquely (and which can even approach the perpendicular) with respect to the radially outward direction. As the engager enters the high wrap region and the groove in the frame gradually transitions to a more upwardly extending orientation, gravity acts to pull the engager down and out from the groove. The engager therefore tends to disengage the groove, rendering the trace data inaccurate.

As described more fully in U.S. Pat. No. 6,618,952, the disclosure of which is incorporated herein by reference, a tracer apparatus for tracing frames having a relatively high wrap has been developed. The tracer disclosed in the '952 patent includes an object engager which engages and traces the frames, and an actuator which moves the object engager into contact with and then along the frames. However, the tracer disclosed in the '952 patent maintains the frames in a fixed position during tracing. The tracer apparatus is therefore adapted to account for high wrap of the frame.

SUMMARY OF THE INVENTION

The present invention relates to a holding mechanism for holding a lens mount of an eyeglass frame, a lens or a lens pattern for a tracer. The holding mechanism adjustably positions the frame, lens or lens pattern relative to an object engager of the tracer apparatus, thereby eliminating or minimizing the effects of high wrap during the tracing process.

A holding mechanism for holding an eyeglass frame is disclosed. The holding mechanism includes a base, a clamping mechanism configured for releaseably securing a lens mount of an eyeglass frame, and an actuator operatively associated with the clamping mechanism for causing linear and rotational movement thereof. The clamping mechanism is moveably coupled to the base for linear and rotational movement about an axis of rotation relative to the base, wherein the clamping mechanism is rotatable about first and second spaced pivot points. The present invention also relates to a method of tracing a lens mount of an eyeglass frame.

A holding mechanism for holding a lens mount of an eyeglass frame according to an embodiment of the present invention includes a base plate having a slot formed therein which defines a cam path. A table is provided, which has first and second spaced bearings extending outwardly from a first major surface of the table. The bearings are received in and moveable along the cam path so that the table is moveably connected to the base plate. A clamping mechanism extends outwardly from a second major surface of the table opposite the first major surface. The clamping mechanism has at least one clamp adapted for releaseably securing an eyeglass frame in a fixed position relative to the table. A motor operatively associated with the table moves the bearings along the cam path in first and second directions.

The present invention also relates to a method of tracing a lens mount of an eyeglass frame. Eyeglass frames are secured proximate a tracer apparatus having an object engager. At least a portion of a first lens mount is traced with the object engager, thereby generating initial trace data. A delta Z of the first lens mount is calculated based on the generated initial trace data. The eyeglass frames are tilted about a vertical axis by a first prescribed angle if the delta Z value exceeds a predetermined threshold, wherein the first prescribed angle corresponds to the first delta Z value. The first lens mount is retraced using the tracer apparatus if the first delta Z value exceeded the predetermined threshold, thereby generating secondary trace data.

DETAILED DESCRIPTION OF PREFERRED EMBODIMENTS

A holding mechanism 10 for holding an eyeglass frame F for tracing the corresponding lens mounts by a tracer apparatus 12 according to an embodiment of the present invention is best shown in FIGS. 1-4, 7, 9, 11 and 12. Holding mechanism 10 is configured for holding frame F. However, holding mechanism 10 may also be adapted for holding a lens or a lens pattern, explained in further detail below.

Figure 1:
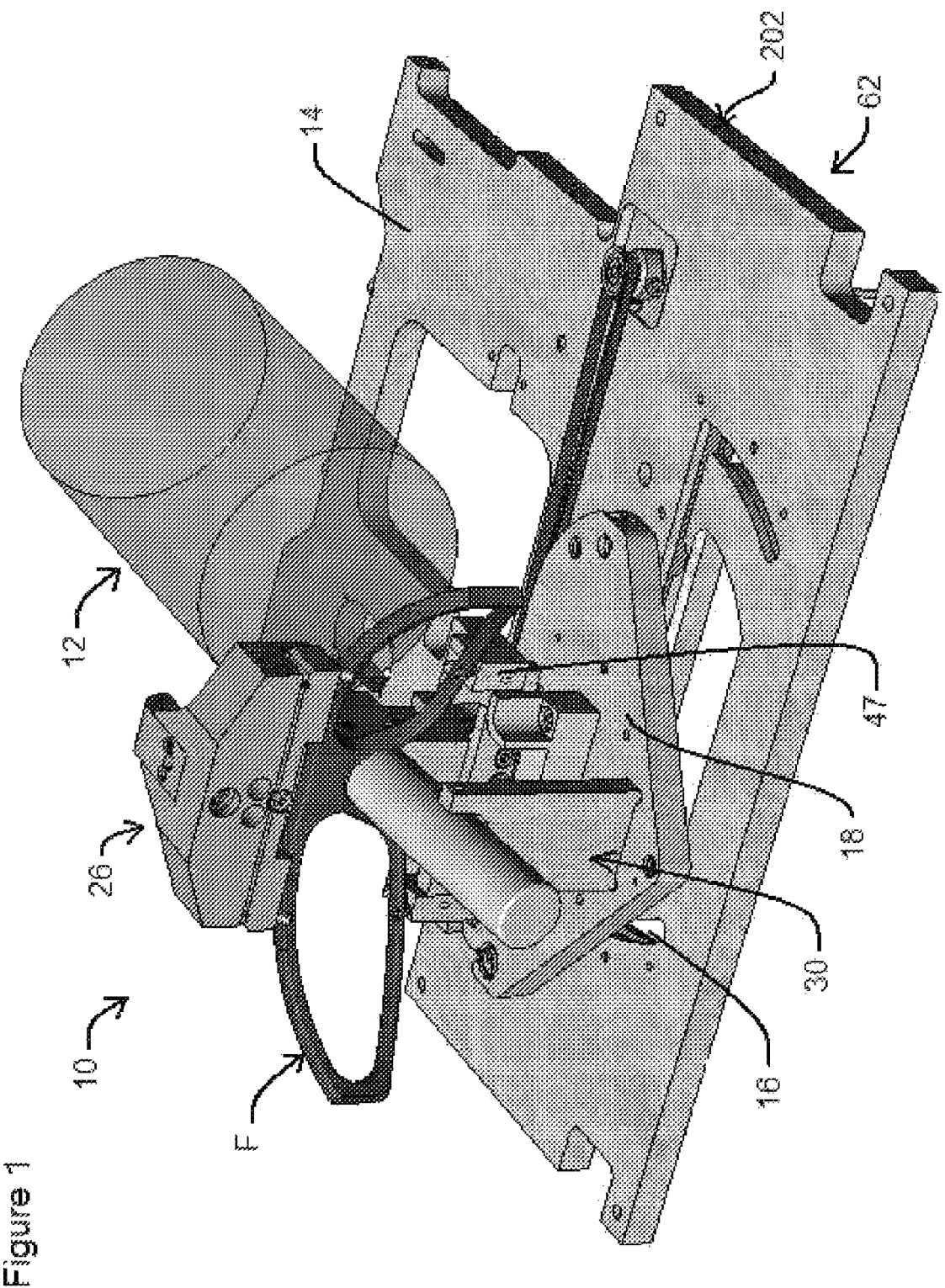
FIG. 1 is a perspective view of a holding mechanism according to an embodiment of the present invention.
Figure 2:
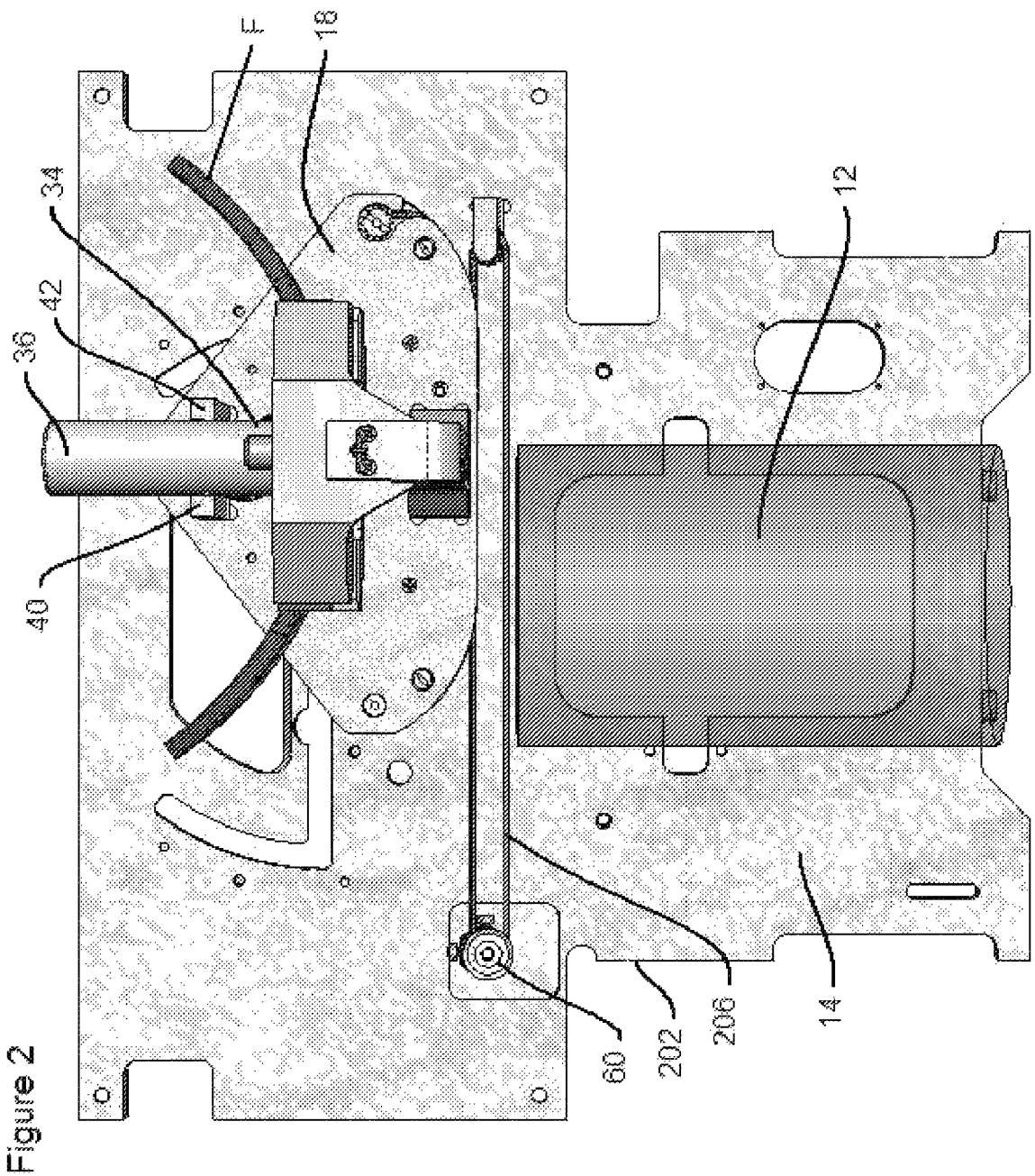
FIG. 2 is a top plan view of the holding mechanism of FIG. 1.
Figure 3:
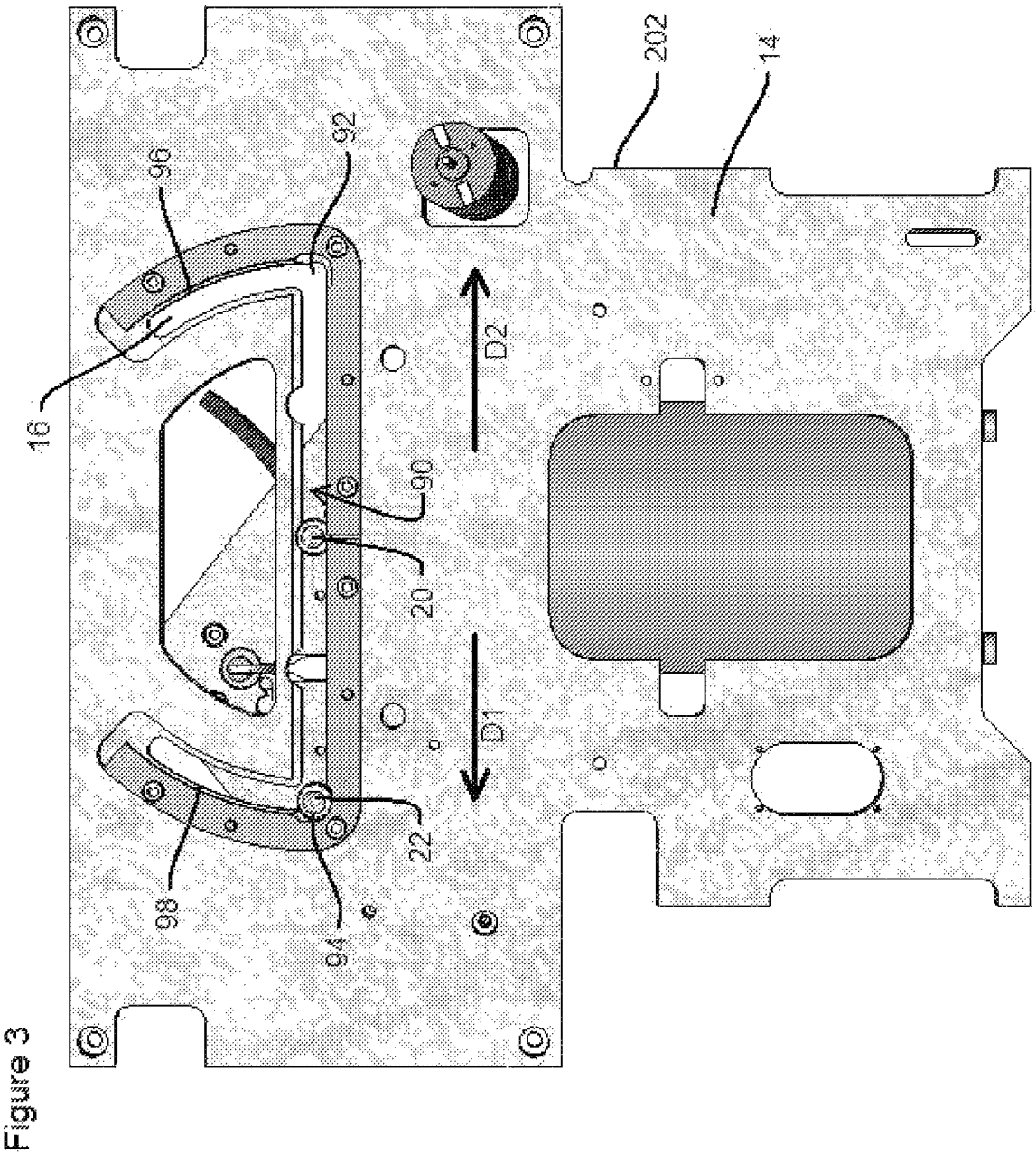
FIG. 3 is a bottom plan view of the holding mechanism of FIG. 1.
Figure 4:
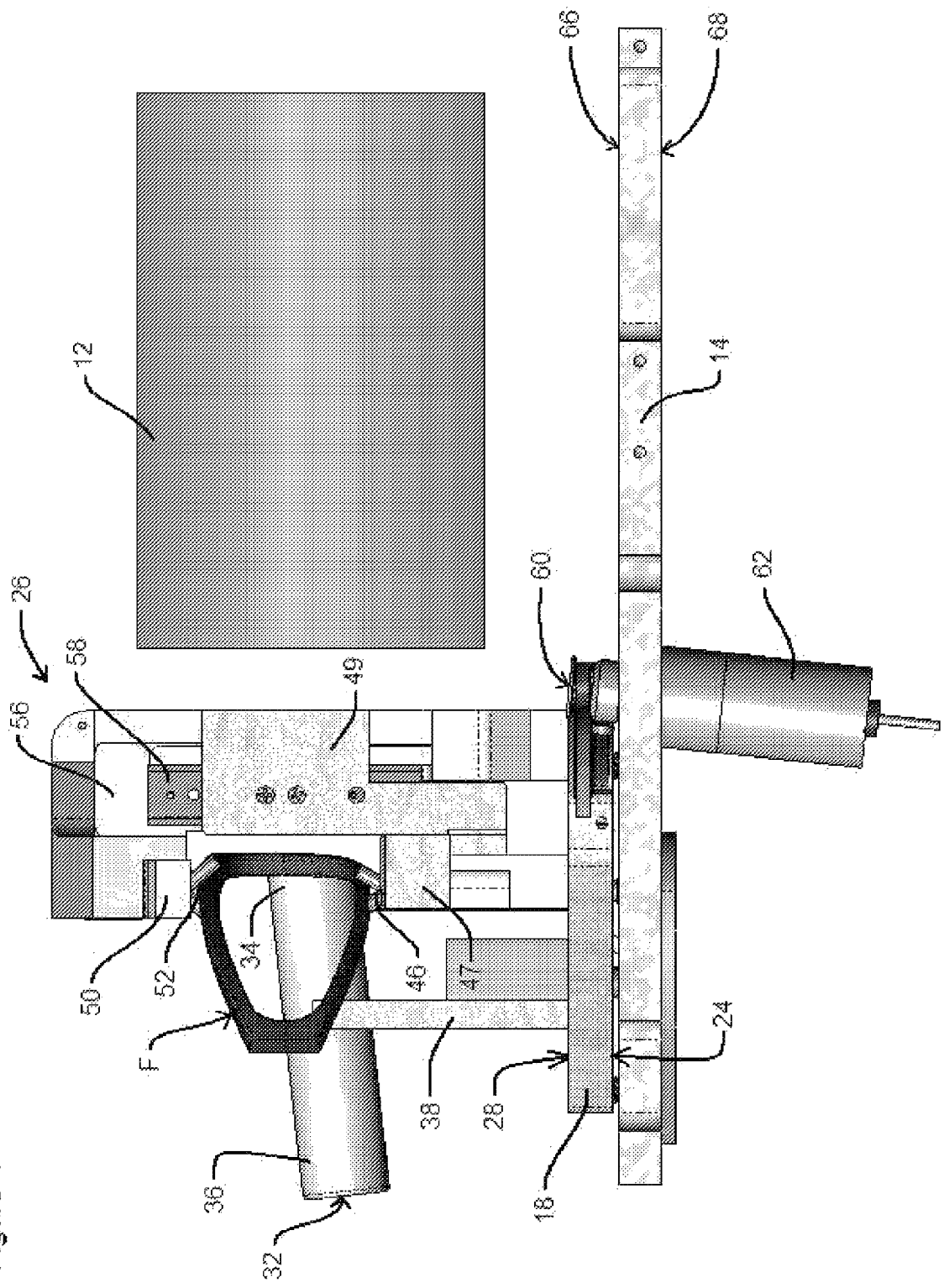
FIG. 4 is an elevational view of the holding mechanism of FIG. 1.
Figure 5:
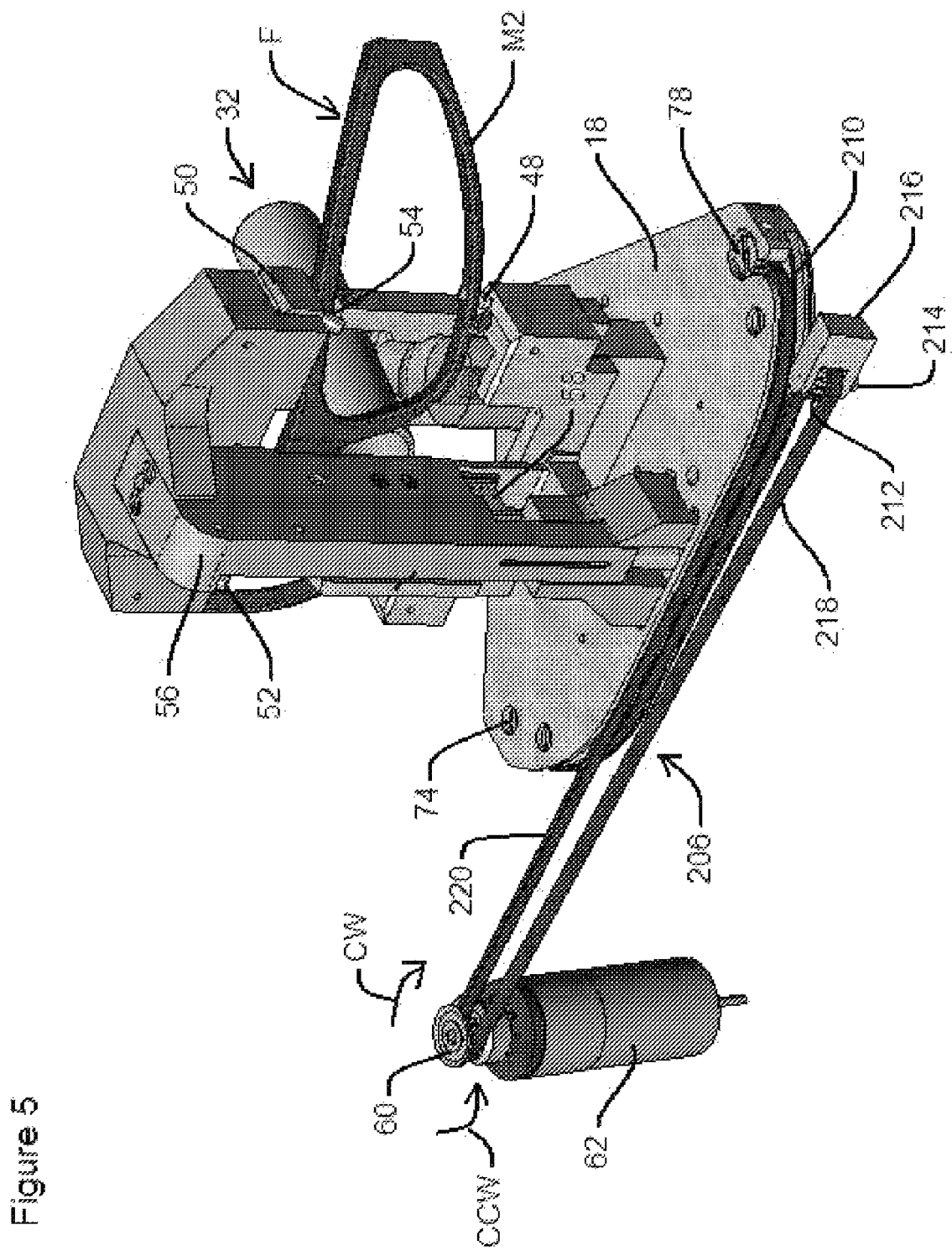
FIG. 5 is a perspective view of some components of the holding mechanism of FIG. 1.

Referring to FIGS. 1-4, holding mechanism 10 includes a base plate 14 having a slot 16 formed therein, which defines a cam path. A table 18 having first and second spaced bearings 20, 22 is provided. Bearings 20, 22 extend outwardly from a first major surface 24 of table 18, as best shown in FIGS. 3 and 4. Bearings 20, 22 are received in and moveable along the cam path. In this way, table 18 is moveably connected to base plate 14.

As best shown in FIGS. 1 and 4, a clamping mechanism 26 extends outwardly from a second major surface 28 opposite first major surface 24 of table 18. Clamping mechanism 26 is preferably adapted for releaseably securing an eyeglass frame F in a fixed position relative to table 18.

Figure 6:
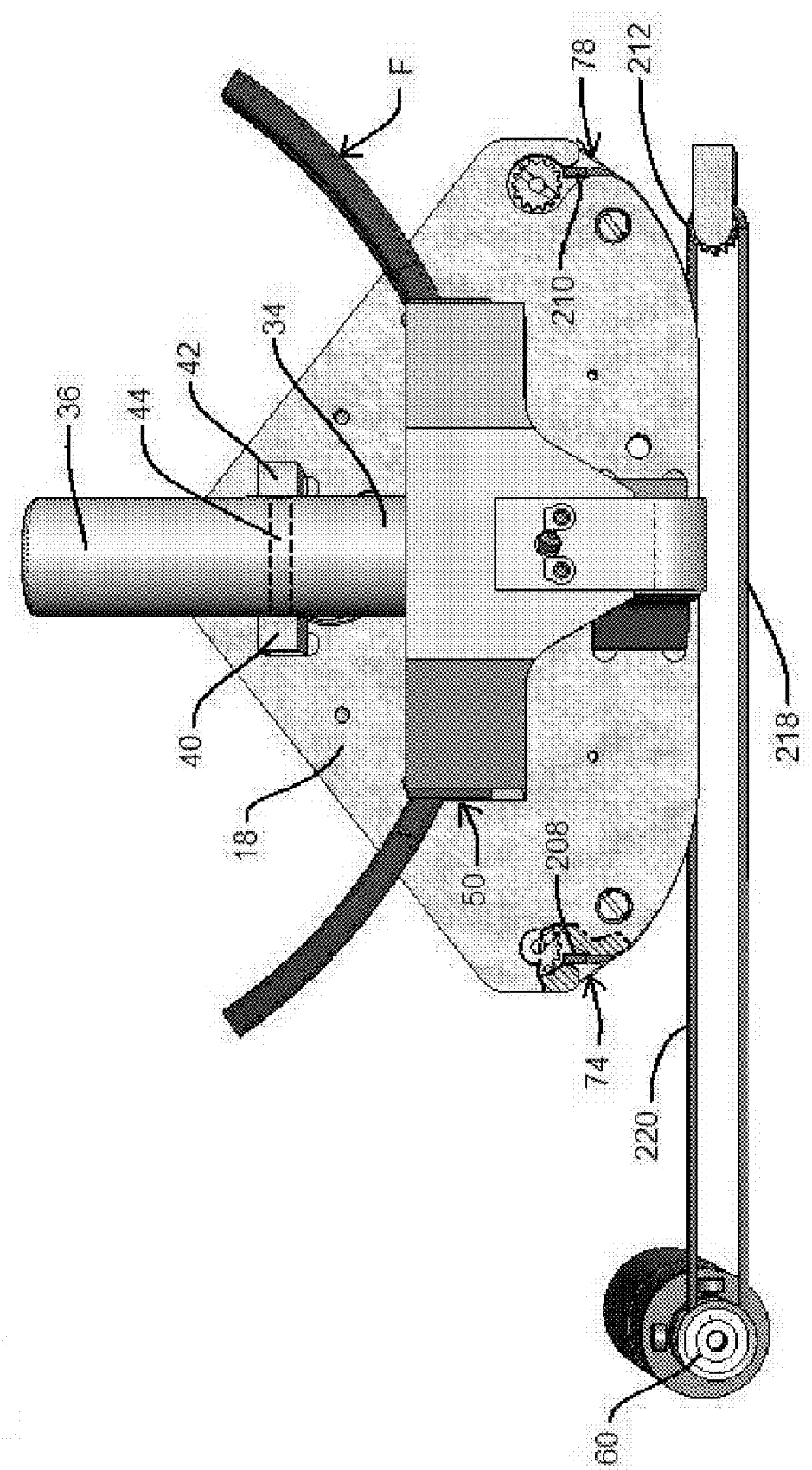
FIG. 6 is a top plan view of the components shown in FIG. 5, with portions shown in phantom.

Clamping mechanism 26 preferably includes a frame centering device 30 adapted to engage and support a nose portion of the eyeglass frame F. Referring to FIGS. 1, 4 and 6, frame centering device 30 may include a cylindrical member 32 having a first portion 34 configured for engaging the nose portion and a second portion 36 spaced therefrom. A support wall 38 having first and second spaced centering arms 40, 42 extends upwardly from second major surface 28 of table 18. Cylindrical member 32 is pivotably disposed between centering arms 40, 42 on a pin 44 (shown in phantom in FIG. 6) which extends between centering arms 40, 42. Pin 44 extends through an associated opening (not shown) in cylindrical member 32 on an axis substantially perpendicular to the longitudinal axis of cylindrical member 32. The opening for pin 44 is disposed in cylindrical member 32 such that second portion 36 acts as a counterweight. First portion 34 is pivotally biased upwardly and against the nose portion when the eyeglass frames F are supported thereon due to the weight of second portion 36.

Figure 7:
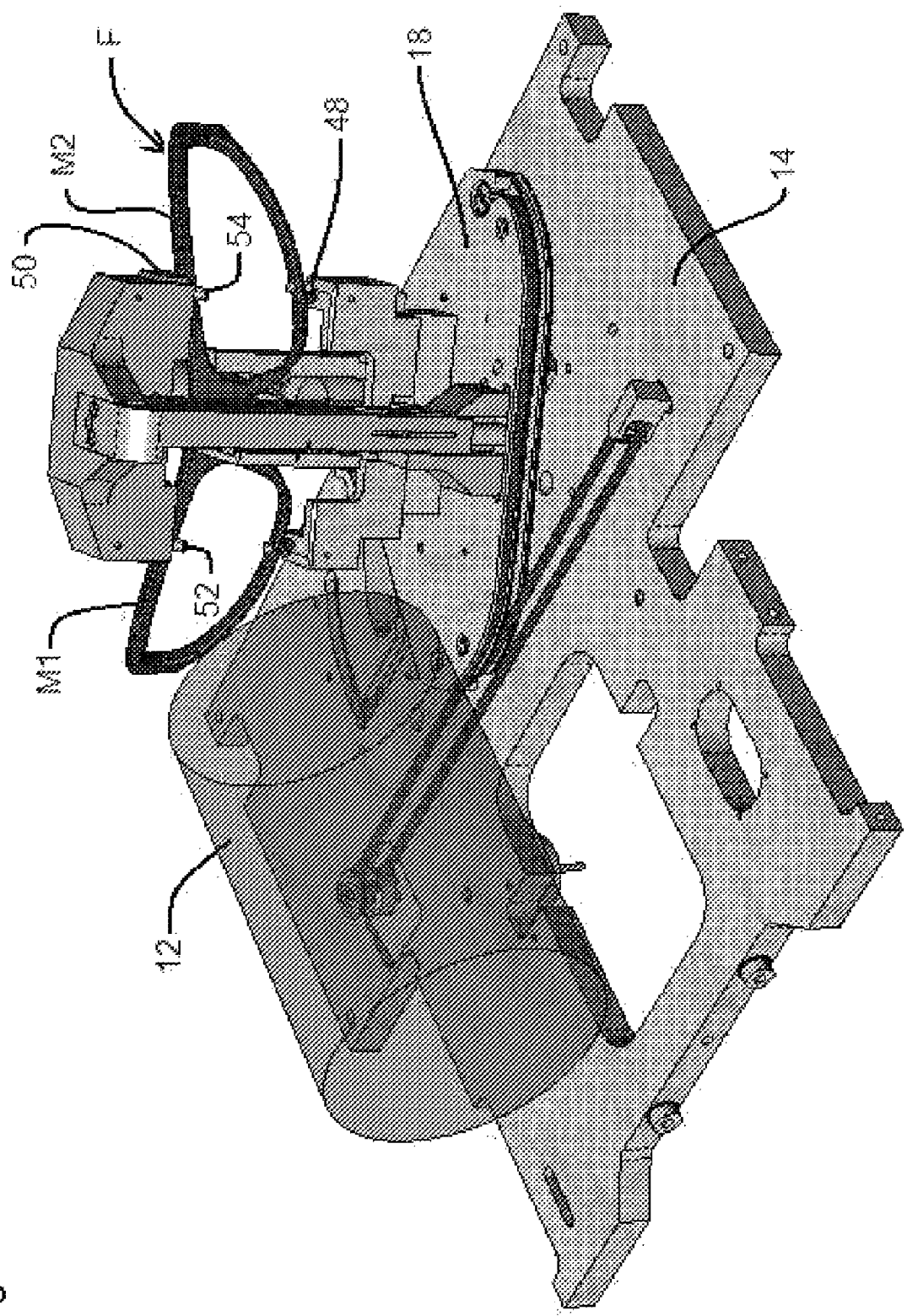
FIG. 7 is another perspective view of the holding mechanism of FIG. 1.
Figure 8:
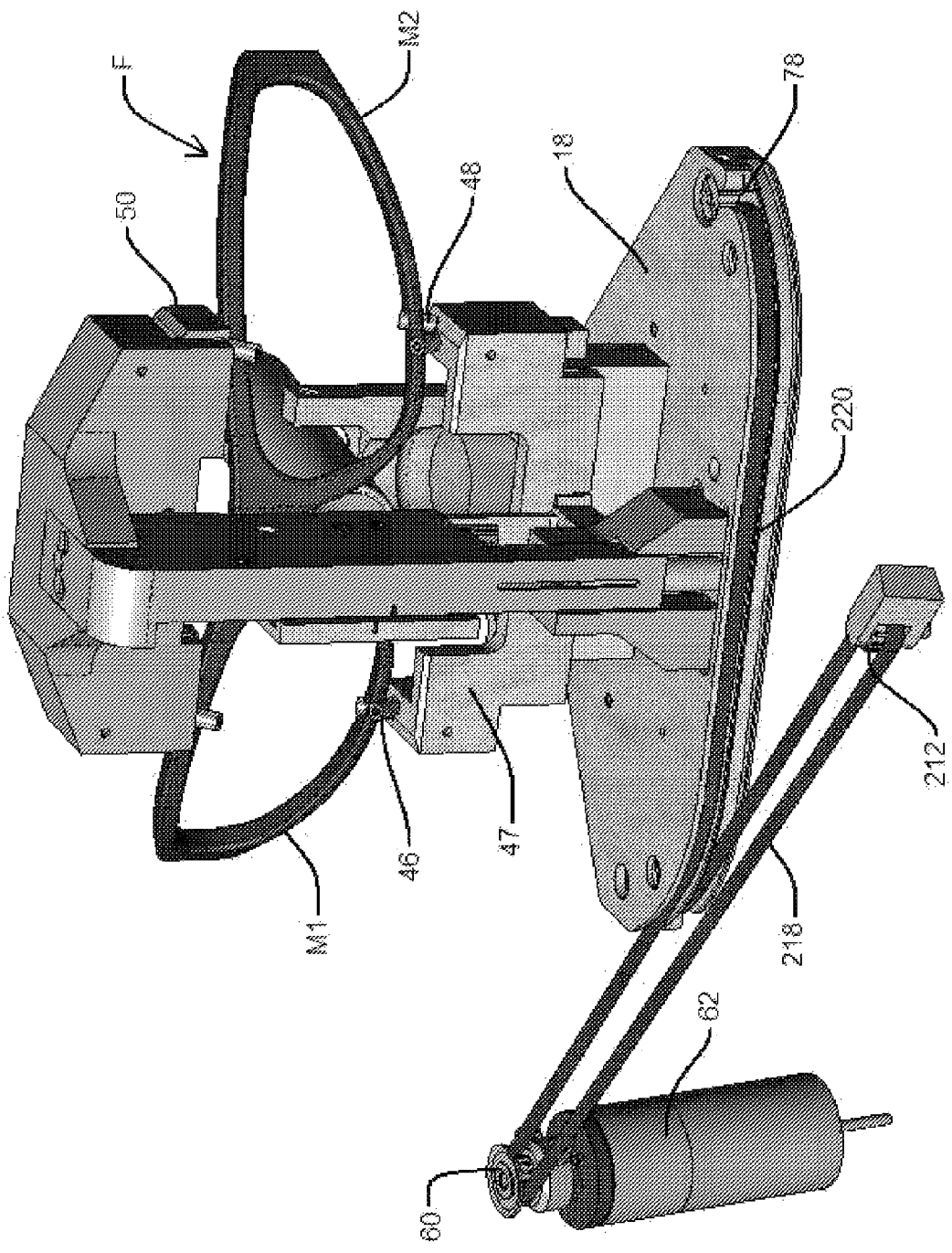
FIG. 8 is perspective view of some components of the holding mechanism of FIG. 1.

Referring to FIGS. 4, 7 and 8, clamping mechanism 26 also preferably includes a lower clamp arm 47 which includes first and second spaced lower frame holders 46, 48, which are configured to engage and support lower edges of corresponding lens mounts M1, M2 of frame F. Lower frame holders 46, 48 are preferably sufficiently spaced such that each frame holder 46, 48 engages the lower edge of lens mounts M1 and M2 of frame F at a position thereof which accommodates a broad variety of frames of different sizes. For example, lower frame holders 46, 48 may be spaced from each other by between about 65 mm to about 75 mm, more preferably about 70 mm. Each of lower frame holders 46, 48 may include two pins disposed in a V-shaped configuration.

Clamping mechanism 26 also preferably includes an upper clamp arm 50. Upper clamp arm 50 preferably includes first and second spaced upper frame holders 52, 54, which are configured to engage and retain upper edges of the corresponding lens mounts M1, M2. Each of upper frame holders 52, 54 is preferably aligned with a corresponding one of lower frame holders 46, 48, so that lens mounts M1, M2 are retained between lower and upper frame holders 46, 48 and 52, 54.

Upper clamp arm 50 may be connected to and supported by an upper clamp support 56. Preferably, upper clamp support 56 is moveably disposed on a linear bearing or other guide mechanism 58, as shown in FIG. 4. Upper clamp support 56 is vertically moveable toward and away from table 18. Lower clamp arm 47 may be connected to and supported by a lower clamp support 49. Preferably, lower clamp support 49 is movably disposed on a linear bearing or other guide mechanism 58. Lower clamp support 49 is vertically moveable toward and away from table 18. More specifically, the upper clamp support 56 and lower clamp support 49 are moveably disposed with each other establishing a coordinated motion that is always centered about a fixed horizontal plane. As such, upper clamp arm 50, and thus upper frame holders 52, 54, are moveable toward and away from lower clamp arm 47 and thus lower frame holders 46, 48. in this way, clamping mechanism 26 can accommodate differently sized and shaped frames F, while always positioning the frame at the same height relative to tracer apparatus 12. Due to the weight of upper clamp arm 50 and clamp support 56, clamp support 56 is preferably biased downwardly on the linear bearing or other guide mechanism 58 toward table 18 due to gravity. Thus, upper clamp arm 50 and corresponding upper frame holders 52, 54 are biased toward lower frame holders 46, 48. It would be readily understood by one skilled in the art, however, that an associated spring, counterweight, or mechanized device could also be provided in order to move clamp support 56.

Preferably, upper frame holders 52, 54 exert a sufficient downward force so that frame F is rigidly secured by clamping mechanism 26. However, the sufficient downward force is also preferably not excessively high such that frame F is deflected or distorted when secured therein, particularly when tracing eye wire frames or other relatively flexible frames. The weight of clamp arm 50 and clamp support 56 may be adjusted, such as by modifying their size or material construction, to provide for an optimal downward force.

When retained in clamping mechanism 26, frame F is disposed adjacent tracer apparatus 12 so that lens mounts M1, M2 may be traced. Tracer apparatuses suitable for the present invention are available from National Optronics, Inc. of Charlottesville, Va. As described in detail in the '952 patent, a tracer apparatus may include an object engager adapted to move into contact with and then along an inner groove or bevel of a lens mount M1 or M2 via an associated actuator during the tracing process. Alternatively, a lens or a lens pattern may be traced. Tracer apparatus 12 may be either secured to or proximate base plate 14, and positioned so that the object engager is adjacent table 18 and may trace the lens mount secured thereto.

Some tracers, such as the tracer disclosed in the '952 patent, may include an object engager that is angularly and pivotably mounted to the actuator by a pivot mechanism. The actuator moves the object engager along the lens mount independent of a pivot angle of the object engager, which may be advantageous for some frames including a relatively high wrap. Some tracers may also include a rotator adapted to rotate the object engager along the lens mount, wherein the pivot mechanism is adapted to pivot the object engager away from an axis of rotation of the rotator so that the object engager engages the lens mount (or the edge of the lens or lens pattern). The pivot mechanism is adapted to facilitate movement of the object engager toward or away from the axis of rotation as the object engager is actuated. Such tracers including a pivot mechanism suitable for tracing frames having high wrap may be used with the present invention.

However, tracer apparatus 12 need not include a pivot mechanism to accurately trace frames having high wrap due to moveable table 18, which may move frames F relative to the object engager on tracer apparatus 12 so that the effects of high wrap during the tracing process are eliminated or minimized.

Referring to FIGS. 1, 2, 4 and 5, holding mechanism 10 may include tooth sprocket 60 and an associated motor 62. Tooth sprocket 60 and motor 62 are spaced from table 18, but may be disposed adjacent a periphery 202 of base plate 14.

Motor 62 is preferably secured to base plate 14. Base plate 14 may include an opening through which a shaft associated with motor 62 extends. Sprocket 60 is disposed adjacent upper surface 66 of base plate 14 and substantially coplanar with table 18, as shown in FIG. 4. Motor 62 extends downwardly away from underside 68 of base plate 14.

It should be understood that the specific orientation of motor 62, tooth sprocket 60, idler sprocket 212 and timing belt 206 relative to table 18 and/or base plate 14 may be modified, particularly if the size and configuration of tracer apparatus 12 requires such modification.

Referring to FIGS. 1, 2 and 5-10, sprocket 60 is coupled to table 18 via a timing belt 206. Timing belt 206 includes a first end 208 secured within first groove 74 in table 18, and a second end 210 secured within second groove 78 in table 18, as best shown in FIG. 6. A single idler sprocket 212 is provided, which is spaced from tooth sprocket 60. Idler sprocket 212 is rotatably disposed on an idler shaft 214, and secured to base plate 14 via an idler sprocket bracket 216. Timing belt 206 is looped around tooth sprocket 60, with a first portion 218 extending from tooth sprocket 60, around idler sprocket 212 and toward first groove 74. A second portion 220 of timing belt 206 extends from tooth sprocket 60 directly to second groove 78, without looping around idler sprocket 212.

Figure 11:
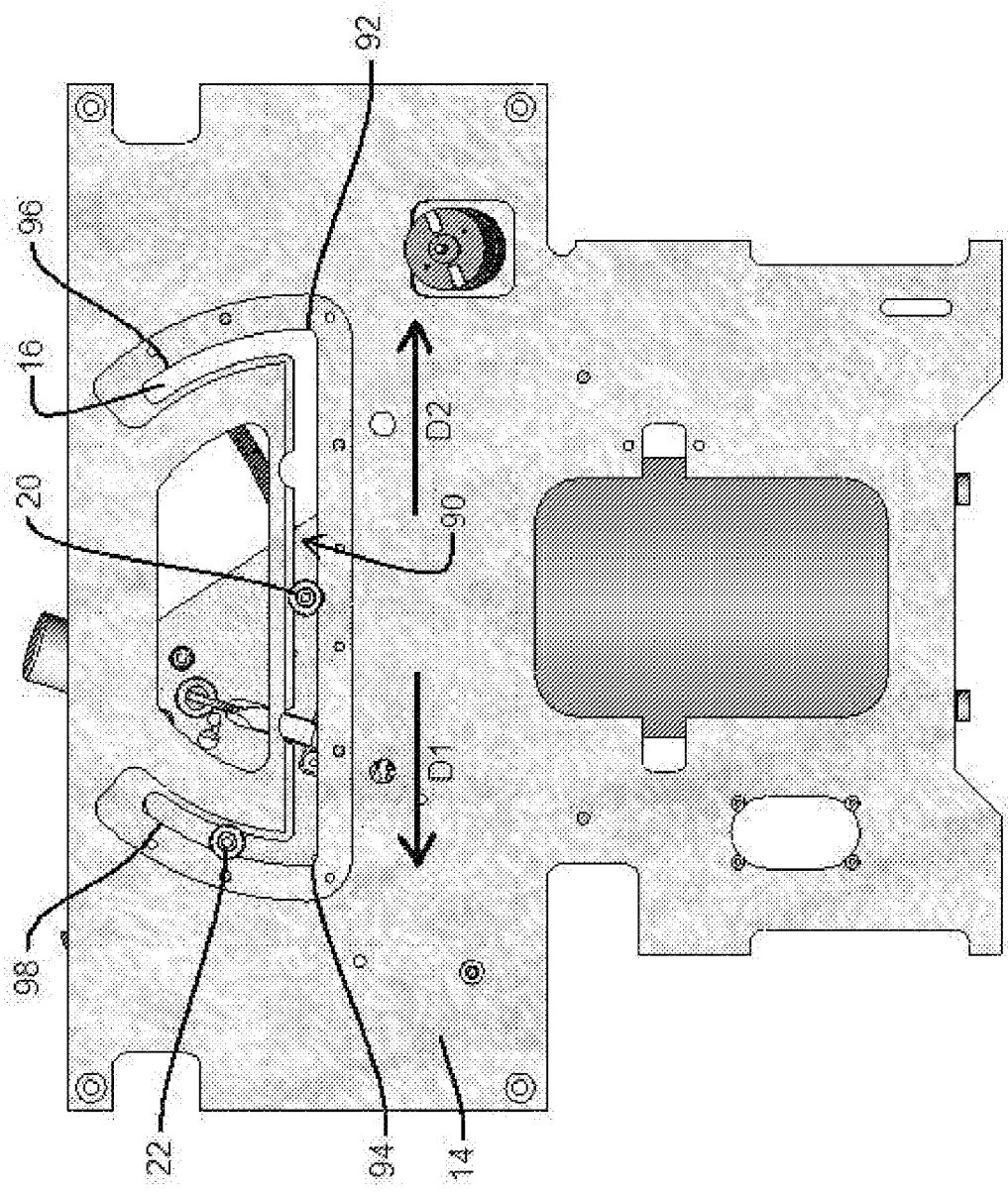
FIG. 11 is a bottom plan view of the holding mechanism showing bearings in a first orientation along a cam path.
Figure 12:
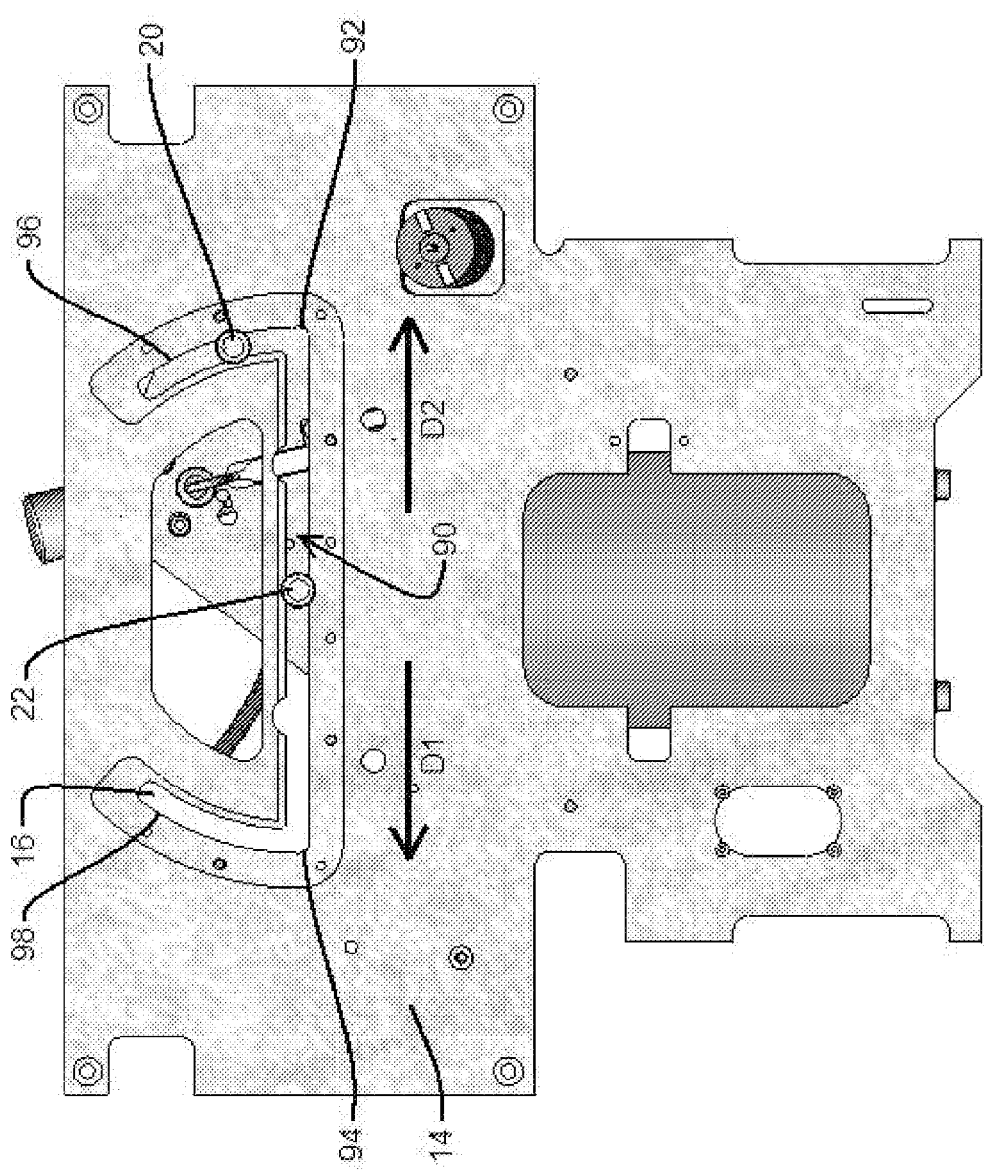
FIG. 12 is a bottom plan view of the holding mechanism showing bearings in a second orientation along the cam path.

As best shown in FIGS. 3, 11 and 12, slot 16 defines a U-shaped cam path having a linear portion 90 having a first end 92 and a second end 94, a first arcuate portion 96 extends outwardly from first end 92, and a second arcuate portion 98 extends outwardly from second end 94. Clockwise rotation of tooth sprocket 60 (shown by arrow CW in FIG. 5) pulls first end 208 of timing belt 206, while providing slack to second end 210, thereby pulling bearings 20, 22 along slot 16 in a first direction (shown by arrow D1. In this way, table 18 is moved in first direction D1. Counterclockwise rotation of tooth sprocket 60 (shown by arrow CCW in FIG. 5) pulls second end 210 of timing belt 206, while providing slack to first end 208, thereby pulling bearings 20, 22 along slot 16 in a second direction (shown by arrow D2). Table 18 is thereby moved in second direction D2. Tension is maintained on timing belt 206 as it moves in clockwise CW and counterclockwise CCW directions.

First and second bearings 20, 22 are sufficiently spaced such that first bearing 20 is positioned at a midpoint of linear portion 90 of the cam path when second bearing 22 has moved to second end 94, as shown in FIG. 3. No further linear motion of first bearing 20 in direction D1 occurs after second bearing 22 has reached second end 94. However, as first end 208 of timing belt 206 continues to pull table 18, second bearing 22 is forced along second arcuate portion 98 away from second end 94, as shown in FIG. 11. First bearing 20 defines a first pivot point of table 18 when disposed at the midpoint of linear portion 90, with second bearing 22 proceeding along second arcuate portion 98. Movement of second bearing 22 along second arcuate portion 98 translates into rotational movement of table 18.

Similarly, second bearing 22 is positioned at the midpoint of linear portion 90 of the cam path when first bearing 20 has moved to first end 92. No further linear motion of second bearing 22 in direction D2 occurs after first bearing 20 has reached first end 92. As second end 210 of timing belt 206 continues to pull table 18, first bearing 20 is forced along first arcuate portion 96 away from first end 92, as shown in FIG. 12. Second bearing 22 defines a second pivot point of table 18 when disposed at the midpoint of linear portion 90 as first bearing 20 proceeds along first arcuate portion 96. Movement of first bearing 20 along first arcuate portion 96 translates into rotational movement of table 18.

Figure 9:
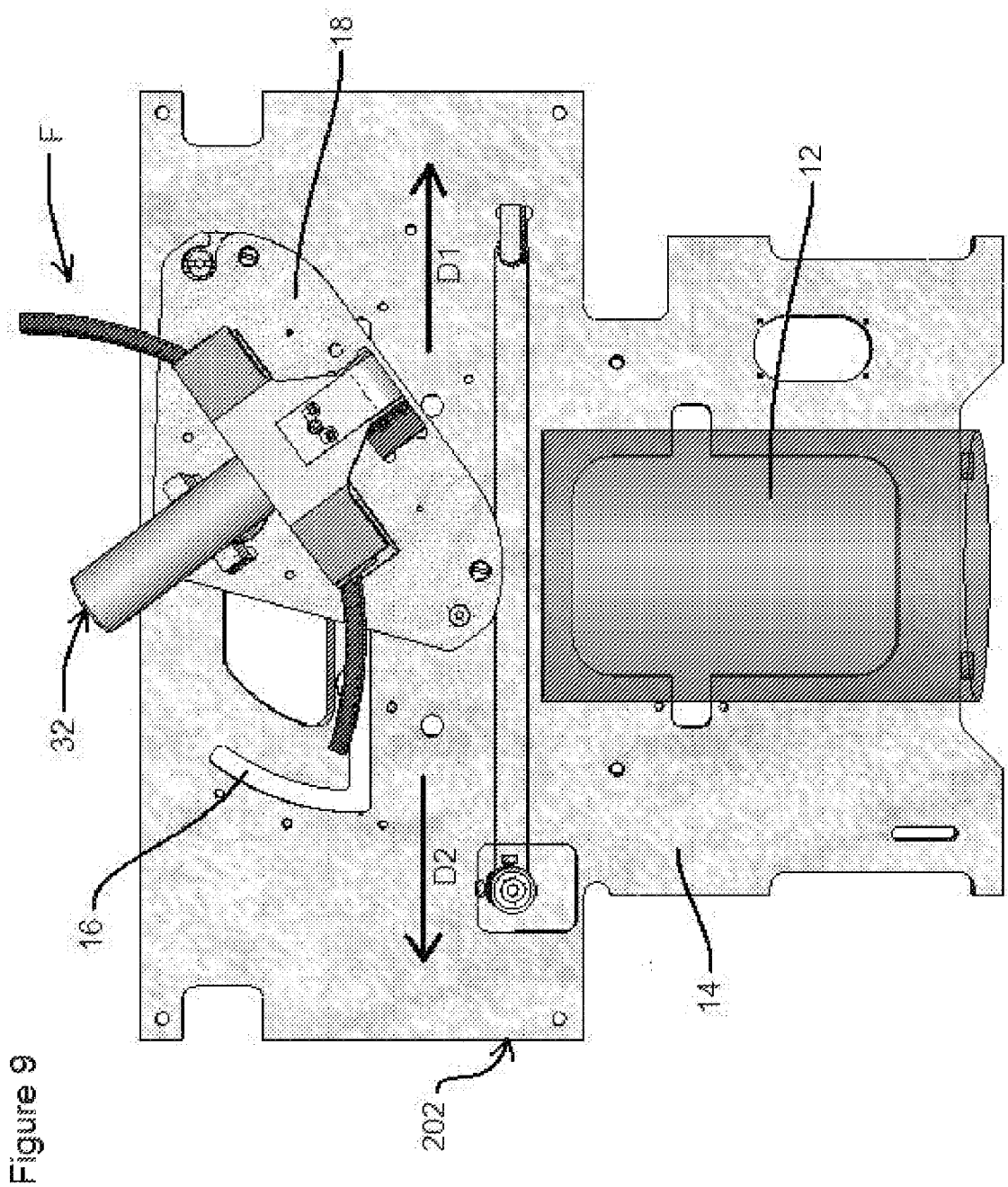
FIG. 9 is another top plan view of the holding mechanism of FIG. 1.
Figure 10:
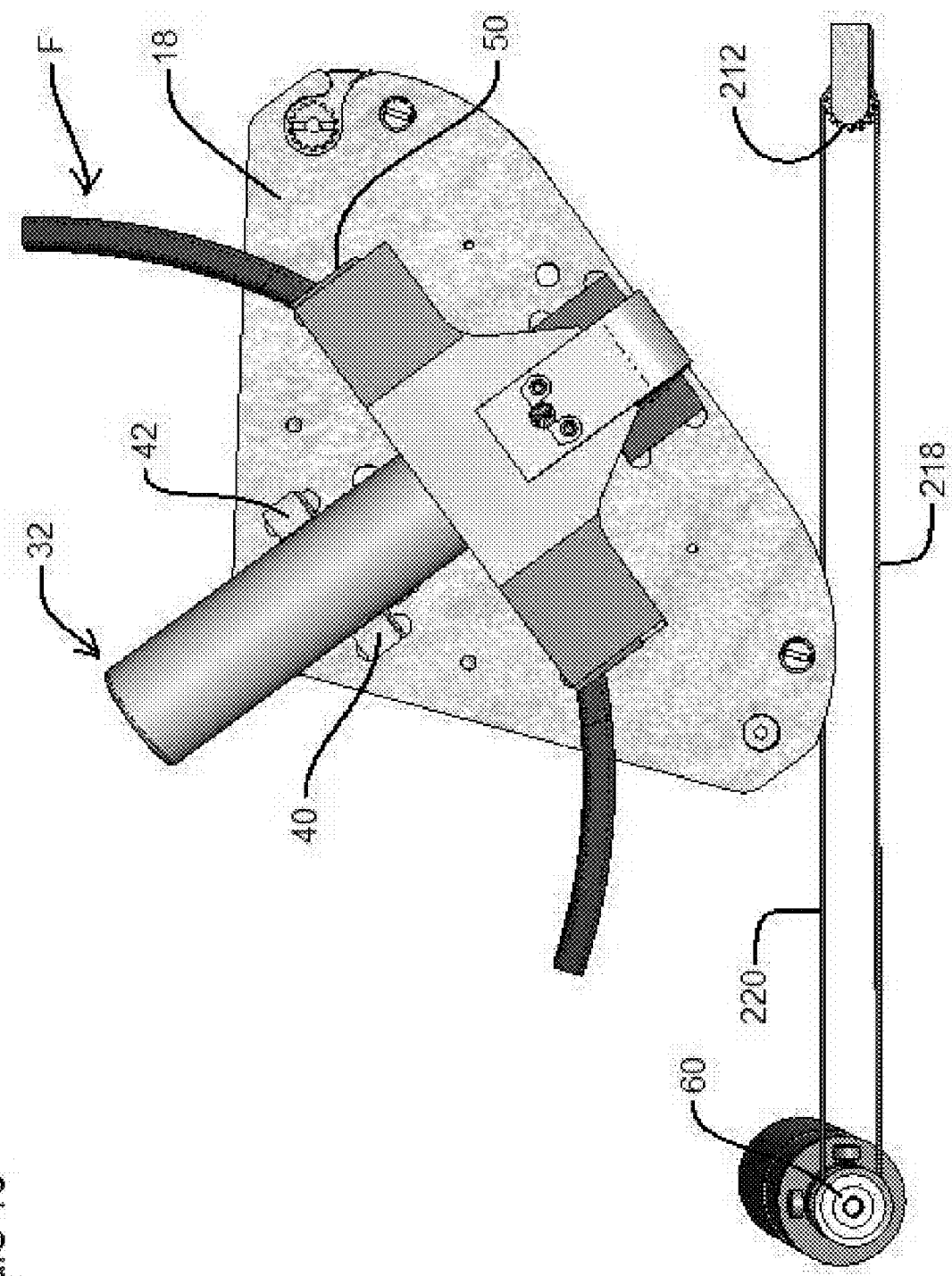
FIG. 10 is a top plan view of some components of the holding mechanism of FIG. 1.

Tracer apparatus 12 may include a controller such as a microcomputer for controlling trace cycles, a user interface, and a display screen. Preferably, tracer apparatus 12 includes a touch screen user interface for acquiring or entering a job number, setting up the trace cycle as desired, selecting frame type and/or material, and entry of other instructional data, as described in the '952 patent. Motor 60, and thus movement of table 18, is controlled by the controller associated with tracer apparatus 12. When the first trace cycle is initiated, table 18 may be biased either in first direction D1 until lens mount M1 is positioned 'straight on' to the object engager of tracer apparatus 12, or in second direction D2 until lens mount M2 is positioned straight on to the object engager depending on the user's selection and processing instructions, as shown in FIGS. 7 and 9 depending on initial parameters. Lens mount M1 is moved horizontally (left or right) by rotating tooth sprocket 60 clockwise CW or counterclockwise CCW, thereby pulling table 18 in first or second directions D1, D2 via timing belt 206 and moving bearings 20, 22 along linear portion 90.

Motor 60 may be controlled by the associated controller such that table 18 is automatically moved by a predetermined distance based on frame information input or selected by the user. Alternatively, associated controls for causing movement of table 18 in directions D1 or D2 may be provided. In either case, table 18 may be moved by a controlled distance so that lens mount M1 is positioned 'straight on' to tracer apparatus 12. In this straight on position, the object engager may be aligned with and start the tracing process at a known position relative to the lens mount M1. For example, the object engager may be aligned with lower frame holder 46 (or 48 depending on the lens mount being traced) or upper frame holder 52 (or 54). Given frame holder 46, 48, 52, 54 engage lens mounts M1, M2, the position of the lens mount M1, M2 at these points is known. In this way, the object engager properly engages the lens mount M1 or M2 when the tracing process is initiated.

However, the object engager could also be aligned at other positions relative to lens mount M1 (or M2), such as the boxing center of the lens mount M1. As known in the art, the 'boxing center' is defined as the center of the smallest rectangle which encloses the lens mount shape using horizontal and vertical lines. The horizontal or A dimension is defined as the distance between the two vertical sides of the box. The distance between the top and bottom of the box is the vertical or B dimension. The curvature or wrap of lens mount M1, or height Z, is also determined by tracer apparatus 12.

As noted above, tracer apparatus 12 includes an object engager adapted to move into contact with and then along an inner groove or bevel of lens mount M1 during the tracing process. Tracer apparatus 12 may include rotation and pivot mechanisms to account for the A and the B dimensions of lens mount M1, as well as Z data. However, because table 18 is horizontally moveable as bearings 20, 22 move along linear portion 90, tracer apparatus 12 may be stationary with respect to right and left movement.

Initial trace data of lens mount M1 is gathered by tracer apparatus 12 during the first trace cycle. From this initial trace data, a ΔZ value of the maximum and minimum A dimension measurements is established. The ΔZ value is used to evaluate if frame tilting via rotation of frame F on table 18 is needed to accommodate for frame wrap. A threshold ΔZ value may be used to determine whether frame titling is needed, which may be a default threshold or a user definable threshold that is empirically established based on lab experience.

If the threshold ΔZ value is not exceeded, frame tilting is not required to accurately trace lens mount M1. The initial trace data of lens mount M1 is sufficiently accurate. Frame F may then be linearly moved in direction D2 via actuation of motor 60 a controlled or predetermined distance until the object engager of tracer apparatus 12 is aligned with lens mount M2 (if dual eye trace has been specified by the user). Trace data of lens mount M2 is then gathered by tracer apparatus 12 during a second trace cycle. Table 18 may then be returned to its default position on base plate 18, and frame F removed from clamping mechanism 26. The gathered trace data may then be dispatched as needed.

If the threshold ΔZ value is exceeded, frame titling is required. An angle of tilt needed to orthogonalize lens mount M1 to the tracing axis is calculated from the ΔZ value. Predetermined angles of tilt may be provided which correspond to ΔZ values. For example, the greater the ΔZ value, the greater the angle of tilt required. Frame F is tilted by moving second bearing 22 a predetermined distance along second arcuate portion 98 away from second end 94, which corresponds to the calculated angle of tilt required. Table 18 rotates about the first pivot point defined by first bearing 20 disposed at the midpoint of linear portion 90 as second bearing 22 moves along second arcuate portion 98 the predetermined distance.

Once frame F has been rotated to the desired angle of tilt, lens mount M1 is retraced with a second data gathering trace. Rotation of lens mount M1 eliminates or substantially minimizes the affects of high wrap on the tracing process, given lens mount M1 is orthogonalized to the tracing axis of tracer apparatus 12. The ΔZ measurements required by the object engager during re-tracing are thereby minimized, preferably to near zero. In this way, tilting of frame F via rotation of table 18 effectively 'unwraps' lens mounts having a high wrap.

After lens mount M1 has been re-traced, frame F is linearly moved in direction D2 via actuation of motor 60 a controlled or predetermined distance until the object engager of tracer apparatus 12 is aligned with lens mount M2 (if dual eye trace has been specified by the user). If it was determined that lens mount M1 required frame tilting, frame F is tilted to the same calculated angle of tilt required for lens mount M1, but mirrored about a center plane of frame F. The angle of tilt required for lens mount M2 mirrors the angle of tilt required for lens mount M1 given the shape and trace values of lens mount M2 are inverse to those of lens mount M1. Trace data of lens mount M2 is then gathered by tracer apparatus 12. Table 18 may then be returned to its default position on base plate 18, and frames F removed from clamping mechanism 26. The gathered trace data may then be dispatched as needed.

Figure 15:
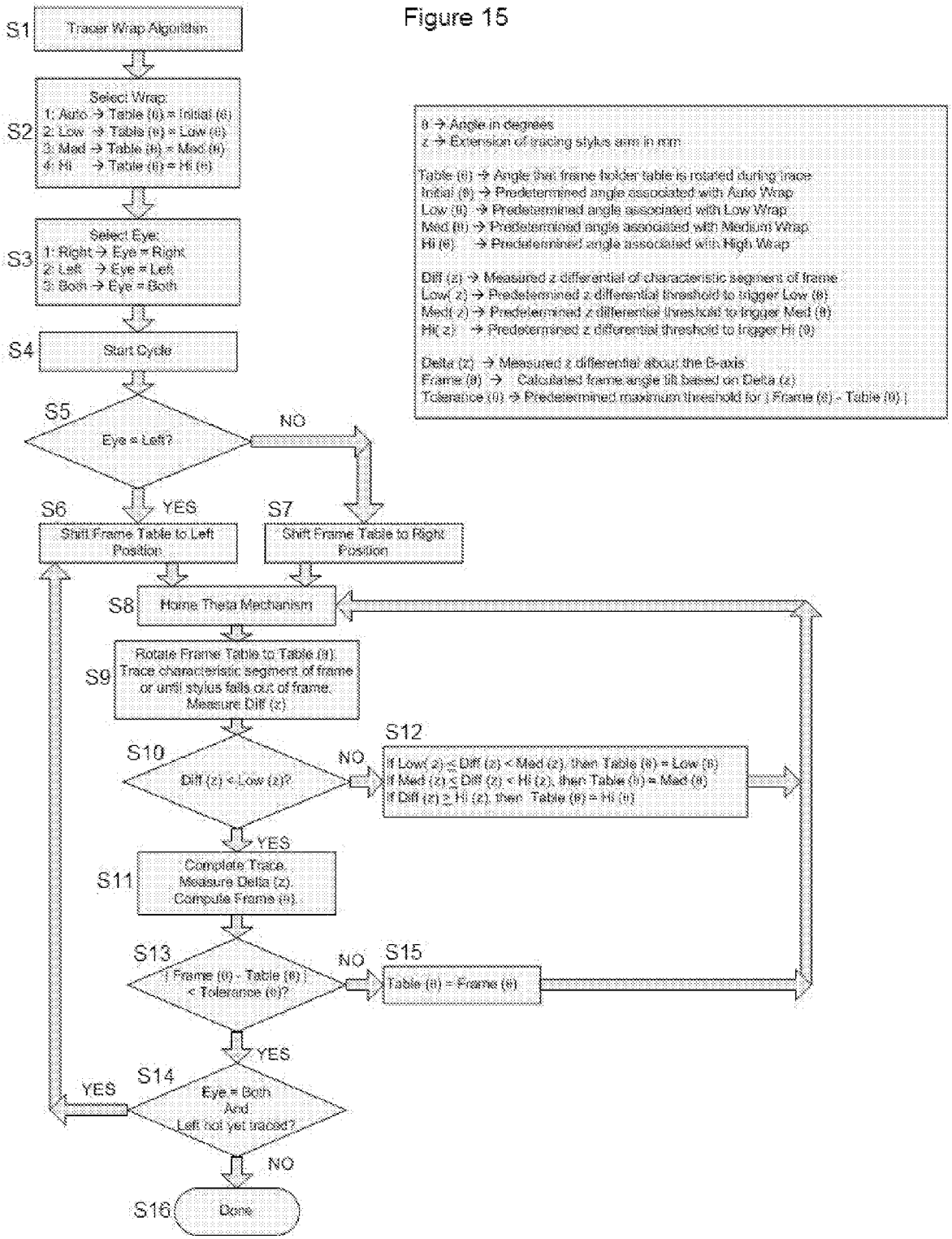
FIG. 15 is a flow chart showing an algorithm according to the present invention for tracing a lens mount of an eyeglass frame.

An algorithm for tracing lens mounts M1, M2 of frames F according to a preferred embodiment will now be described with reference to the flow chart of FIG. 15. Preferably, tracer 12 and holding mechanism are controllable via a user interface (not shown). A user selects a tracer wrap algorithm at S1. The user may then select or pre-set rotational angles associated with a level of wrap at 52. These angles of rotation are therefore predetermined prior to tracing, and may be arbitrarily set by the user. The angles of rotation in a first direction correspond to positions of first bearing 20 along first arcuate portion 96, and angles of rotation in a second direction opposite the first direction correspond to positions of second bearing 22 along second arcuate path 98. For example, the user may set values of 15, 20 and 25 degrees rotation corresponding to 'low', 'medium' and 'high' tilt angles, which correspond to rotational movement of clamping mechanism 26 relative to the tracing axis. A pre-set initial table angle may also be set by the user, for example, an initial tilt angle of 10 degrees. The user also selects whether lens mount M1 or lens mount M2 is to be traced, or if both lens mounts M1, M2 are to be traced, at 83.

As shown in FIGS. 1, 2 and 4-10, frames F are secured to table 18 via clamping mechanism 26 in a substantially vertical orientation relative to base plate 14, with the nose portion of frames F supported by cylindrical member 32 and lens mounts M1, M2 retained between lower and upper frame holders 46, 48, 52, 54. Bearings 20, 22 may be positioned within slot 16 at a default position, wherein bearing 20 is disposed at the midpoint of linear portion 90, as shown in FIG. 3. In this position, table 18 is positioned on base plate 14 so that upper clamp arm 50 is 'straight on' or orthogonalized to the tracing axis of the object engager of tracer apparatus 12, as best shown in FIGS. 1,2 and 4.

The user then starts the cycle at S4. If lens mount M1 was selected for tracing, table 18 is linearly moved in direction D1 to a left position (if not already in the left position) at S5 and S6, wherein second bearing 22 is disposed at second end 94, as shown in FIG. 3. If lens mount M2 was selected for tracing, table 18 is linearly moved in direction D2 to a right position at S5 and S7, wherein first bearing 20 is disposed at first end 92.

Clamping mechanism 26, and therefore frames F, are rotated to an initial pre-set angle, if pre-set by the user at S8. A first trace cycle is then initiated using tracer apparatus 12 at S9, wherein a portion of the selected lens mount M1 (or M2) is traced with the object engager associated with the tracer. When tracing lens mount M1 (or M2), the trace may be initiated at an "initial" tilt angle. Up to about ½ of the circumference of lens mount M1 (or M2) may be traced to make a determination as to the most appropriate angle to use to trace the entire frame. For example, between about 80 degrees and about 180 degrees of the lens mount may be traced during this initial trace. However, it should be understood that the specific portion that is traced may be arbitrarily set by the user. Initial trace data is thereby generated during this initial trace. The Z differential during this initial trace is evaluated against a predetermined range to determine the tilt angle, if any, to use.

Specifically, a delta Z is calculated based on the generated initial trace data at S10, and compared to a predetermined low delta Z threshold ("Low (z)"). Preferably, the delta Z of the lens mount is simultaneously measured as the lens mount is being traced during the first trace cycle.

If the measured delta Z does not exceed the predetermined low delta Z threshold as the initial trace is proceeding, the object engager continues to trace the entire lens mount M1 or M2, and completes the trace at S11.

However, if the measured delta Z exceeds the predetermined low delta Z threshold during the initial trace, but does not exceed a predetermined medium delta Z threshold ("Medium (z)") at S12, then the process reverts back to step S8 and the clamping mechanism 26 is rotated a predetermined angle associated with low wrap ("Low (u)") at S9. If the measured delta Z exceeds the predetermined medium delta Z threshold, but does not exceed a predetermined high delta Z threshold ("High (z)") at S12, then clamping mechanism 26 is rotated a predetermined angle associated with medium wrap ("Medium (u)") at S9. If the measured delta Z exceeds the predetermined high delta Z threshold (S 12), then clamping mechanism 26 is rotated a predetermined angle associated with high wrap ("High (u)") at S9.

The lens mount M1 or M2 is then re-traced at S9 if the predetermined delta Z threshold was exceeded during the initial trace. Thus, during the second trace, one of "Low(u)", "Medium(u)", or "High (u)" tilt angles will be used. These values are set by the operator. The corresponding angle of tilt of clamping mechanism 26 is automatically determined by the associated software.

After the second trace is complete, the software evaluates the measured tilt angle of the frame, and if it is outside a predetermined tolerance (settable by the operator), the software causes the frame to be tilted one more time before tracing lens mount M1 (or M2) a final time. This final tilting of the frame will essentially eliminate the tilt angle of the frame, as interpreted by tracer 12. If necessary, this third trace of the frame will be executed.

Specifically after the second trace, the delta Z is re-measured and compared to the predetermined low delta Z threshold at S10. Further adjustment may be initiated at S12 if the predetermined delta Z threshold is still exceeded. Once the measured delta Z is less than the predetermined low delta Z, the object engager completes the trace, and the frame angle tilt is calculated based on the measured delta Z at S11.

The angle that clamping mechanism 26 was rotated during the preceding trace is subtracted from the calculated frame angle tilt, and the resulting value compared to a predetermined maximum threshold at S13.

If this resulting value is less than the predetermined maximum threshold, the process proceeds to S 14, wherein it is determined whether the other lens mount M1 or M2 is to be traced based on the user's instructions at S14. If the other lens mount M1 or M2 is not to be traced, the process is complete at S16.

If the other lens mount M1 or M2 is to be traced, the process reverts back to step S6, wherein clamping mechanism 26 is shifted to a left or right position (depending on the position of the initially traced lens mount M1 or M2). However, the final tilt angle used for the first lens mount traced is preferably the starting tilt angle for tracing the second lens mount. In this way, the process is expedited when tracing the second lens mount.

If the resulting value calculated at S13 still exceeds the predetermined maximum threshold, the angle that clamping mechanism 26 was rotated during the trace is compared to the calculated frame angle tilt at S15, and the process reverts back to S8 and S9, wherein clamping mechanism 26 undergoes further tilt adjustment based on this comparison and the lens mount M1 or M2 is retraced a third time. The process then proceeds to step S10 as described above.

It should be understood that the algorithm described above and shown in FIG. 15 is exemplary only, and the present invention is not so limited. It would be readily understood that the specific processing steps may be modified. Further, specifications such as the predetermined angles associated with low, medium and high wrap, are predetermined only by user setup. Therefore, as shown in the flow chart, Initial(u), Low (u), Med(u), Hi(u), and Tolerance(u) may all be set by the user. Similarly, predetermined low, medium and high delta thresholds, as well as the predetermined threshold calculated at step S13 described above, may be modified by the user and/or at the time of programming.

As disclosed above, the holding mechanism of the present invention may also be configured for securing a lens or a lens pattern during a tracing operation. A lens or lens pattern may be attached to a pattern or lens holder as described in the '952 patent. For example alignment pins and magnets may be used to secure a lens pattern to a pattern holder, and adhesive pads may be used to secure a lens to a lens holder. The pattern or lens holder may then be secured to holding mechanism 10.

Figure 13:
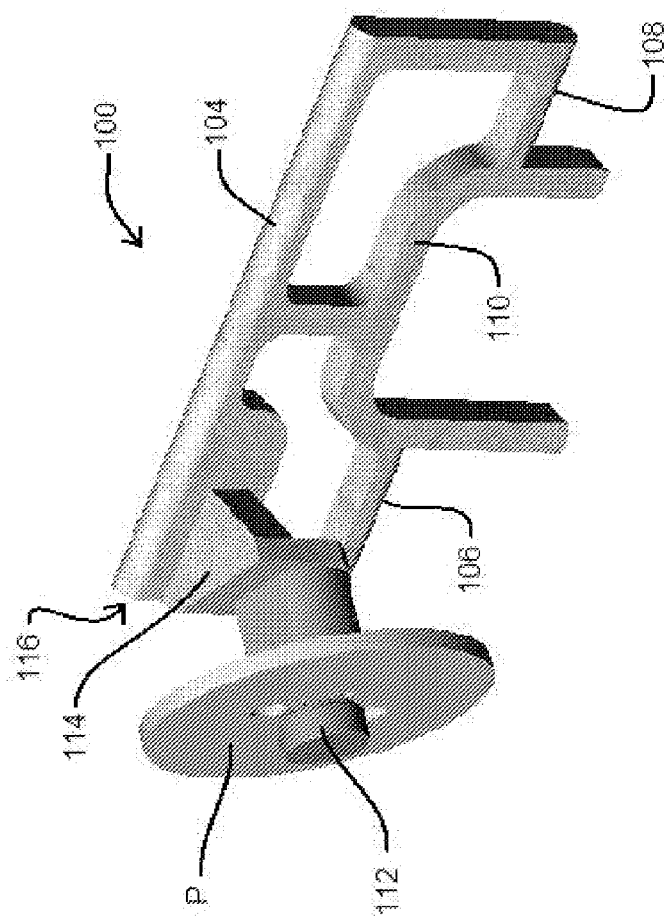
FIG. 13 is perspective view of a fixture for holding a lens or a lens pattern.
Figure 14:
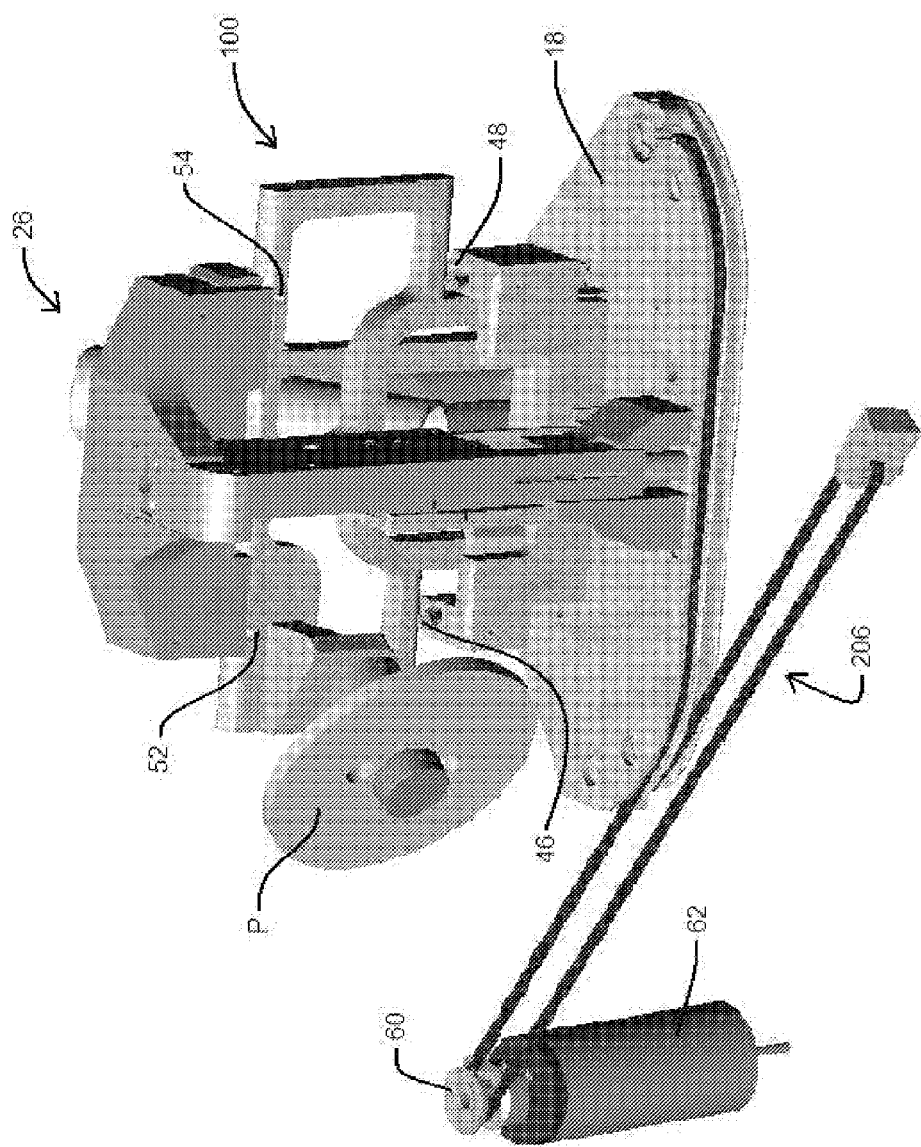
FIG. 14 is a perspective view of some components of the holding mechanism showing the fixture of FIG. 13 secured therein.

As best shown in FIGS. 13 and 14, a fixture 100 includes a frame configured for being releaseably secured by frame holders 46, 48, 52, 54. Fixture 100 includes an upper support 104 for being engaged by upper frame holders 52, 54, and lower supports 106, 108 for being engaged by lower frame holders 46, 48, respectively. As shown in FIG. 13, a U-shaped support 110 is provided intermediate lower supports 106, 108, which is configured for extending around centering device 30 and cylindrical member 32 when fixture 100 is retained between frame holders 46, 48, 52, 54.

A holder 112 extends outwardly from a strut 114 secured to an end 116 of fixture 100, on which a lens pattern P, or a lens, may be secured. When fixture 100 is secured by clamping mechanism 26, table 18 may then be tilted to a predetermined angle wherein the secured pattern P or lens is 'straight on' or orthogonalized to the tracing axis of the object engager of tracer apparatus 12, as shown in FIG. 14. Once in this position, lens pattern P or lens may be completely traced without the need for further rotation of clamping mechanism 26.

It would be readily understood that various other configurations for a fixture for holding a lens pattern or lens may be provided, so long as the fixture secures the lens pattern or lens in a position orthogonal to the tracing axis of tracer 12. For example, a fixture configured for being connected to some other portion of clamping mechanism 26, e.g. upper clamp support 56, or lower clamp support 29, or some other portion holding mechanism 10, may be provided. Trace data is then gathered by tracer apparatus 12, and the lens or lens pattern may then be removed from the associated holder.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above.

I claim:

1. A method of tracing a lens mount of an eyeglass frame, comprising:
   securing an eyeglass frame comprising a lens mount proximate a tracer apparatus, the tracer apparatus comprising an object engager for engaging the lens mount, the lens mount having a wrap;
   tracing at least a portion of the lens mount with the object engager and generating initial trace data;
   calculating a delta Z value of the lens mount based on the generated initial trace data, wherein the delta Z value corresponds to a measurement of the wrap of the secured lens mount;
   tilting the eyeglass frame about a vertical axis by a prescribed angle if the delta Z value exceeds a predetermined threshold, wherein the prescribed angle corresponds to the delta Z value; and
   re-tracing the lens mount of the tilted eyeglass frame using the tracer apparatus if the delta Z value exceeds the predetermined threshold, and generating secondary trace data.

2. The method of claim 1, wherein said steps of tracing and said calculating are carried out simultaneously.

3. The method of claim 1, wherein said calculating of the delta Z value is determined based on said tracing of between about 80 degrees and about 180 degrees of the lens mount.

4. The method of claim 1, wherein:
   the delta Z value is a first delta Z value; and
   the method further comprises
      calculating a second delta Z value of the lens mount based on the generated secondary trace data;
      tilting the eyeglass frame about the vertical axis by the prescribed angle if the calculated second delta Z value exceeds the predetermined threshold; and
      re-tracing the lens mount using the tracer apparatus if the calculated second delta Z value exceeds the predetermined threshold, and generating final trace data.

5. The method of claim 4, wherein:
   the lens mount is a first lens mount, and the eyeglass frame comprises a second lens mount; and
   the method further comprises
      aligning the second lens mount with the object engager;
      tilting the eyeglass frame about a vertical axis by the same angle used for re-tracing the first lens mount and for generating the final trace data; and
      tracing the second lens mount using the tracer apparatus with the object engager and thereby generating final trace data.

6. The method of claim 1, wherein said re-tracing comprises retracing the said portion of the lens mount.

7. A method of tracing a lens mount of an eyeglass frame, comprising:
   securing an eyeglass frame comprising at least one lens mount proximate to a tracer apparatus, the tracer apparatus comprising an object engager for engaging the lens mount, the lens mount having a wrap;
   tracing at least a portion of the secured lens mount with the object engager and generating trace data;
   determining from the generated trace data whether the lens mount has a delta Z value that exceeds a threshold, wherein the delta Z value corresponds to a measurement of the wrap of the secured lens mount; and
   tilting the eyeglass frame about a vertical axis if the delta Z value exceeds the threshold.

8. The method of claim 7, wherein if the delta Z value does not exceed the threshold, tracing a remainder of the secured lens mount without tilting the eyeglass frame about the vertical axis.

9. The method of claim 7, wherein said tilting of the eyeglass frame is by a prescribed angle corresponding to the delta Z value.

10. The method of claim 7, wherein the delta Z value is a first delta Z value, and wherein the method further comprises:
    subsequent to said tilting, retracing at least a portion of the secured lens mount with the object engager and generating retrace data;
    determining from the generated retrace data whether the lens mount of the tilted eyeglass frame has a second delta Z value that exceeds the threshold, wherein the second delta Z value is a measurement of the wrap of the secured lens mount subsequent to said tilting; and
    further tilting the eyeglass frame about the vertical axis if the second delta Z value exceeds the threshold.

11. the method of claim 7, wherein the delta Z value is a first delta Z value, and wherein the method further comprises:
    subsequent to said tilting, retracing at least a portion of the secured lens mount with the object engager and generating retrace data;
    determining from the generated retrace data whether the lens mount of the tilted eyeglass frame has a second delta Z value that exceeds the threshold, wherein the second delta Z value is a measurement of the wrap of the secured lens mount subsequent to said tilting; and
    wherein if the second delta Z value does not exceed the threshold, tracing a remainder of the secured lens mount without further tilting the eyeglass frame about the vertical axis.

12. The method of claim 11, wherein:
    the lens mount is a first mount and the eyeglass frame further comprises a second mount; and initially tracing the second mount at a starting tilting angle that is equal to an angle at which the remainder of the secured first lens mount is traced.

13. The method of claim 7, wherein said determining of the delta Z value is performed based on said tracing of between about 80 degrees and about 180 degrees of the lens mount.

14. The method of claim 7, wherein said tilting is performed about a pivot point.

15. A method of tracing a lens mount of an eyeglass frame, comprising:
    securing an eyeglass frame comprising at least one lens mount proximate to a tracer apparatus, the tracer apparatus comprising an object engager for engaging the lens mount, the lens mount having a wrap;
    establishing low, medium, and high thresholds for a delta Z value of the lens mount, wherein the delta Z value corresponds to a measurement of the wrap of the secured lens mount;
    tracing at least a portion of the secured lens mount with the object engager and generating trace data;
    calculating the delta Z value of the lens mount based on the generated trace data;
    tilting the eyeglass frame about a vertical axis by a first predetermined angled associated with low wrap if the calculated delta Z value exceeds the low threshold but does not exceed the medium threshold;
    tilting the eyeglass frame about the vertical axis by a second predetermined angle associated with medium wrap if the calculated delta Z value exceeds the medium threshold but does not exceed the high threshold, wherein the second predetermined angle is greater than the first predetermined angle; and
    tilting the eyeglass frame about the vertical axis by a third predetermined angle associated with high wrap if the calculated delta Z value exceeds the high threshold, wherein the third predetermined angle is greater than the second predetermined angle.

16. The method of claim 15, wherein if the delta Z value does not exceed the low threshold, tracing a remainder of the secured lens mount without tilting the eyeglass frame about the vertical axis.

17. The method of claim 15, wherein the delta Z value is a first delta Z value, and wherein the method further comprises:
    subsequent to said tilting, retracing at least a portion of the secured lens mount of the tilted eyeglass frame with the object engager and generating retrace data;
    determining from the generated retrace data whether the lens mount of the tilted eyeglass frame has a second delta Z value that exceeds the low, medium, or high threshold, wherein the second delta Z value is a measurement of the wrap of the secured lens mount subsequent to said tilting; and
    further tilting the eyeglass frame about the vertical axis if the second delta Z value exceeds the low, medium, or high threshold.

18. the method of claim 15, wherein the delta Z value is a first delta Z value, and wherein the method further comprises:
    subsequent to said tilting, retracing at least a portion of the secured lens mount of the tilted eyeglass frame with the object engager and generating retrace data;
    determining from the generated retrace data whether the lens mount of the tilted eyeglass frame has a second delta Z value that exceeds the low threshold, wherein the second delta Z value is a measurement of the wrap of the secured lens mount subsequent to said tilting; and
    wherein if the second delta Z value does not exceed the low threshold, tracing a remainder of the secured lens mount without further tilting the eyeglass frame about the vertical axis.

19. The method of claim 18, wherein:
    the lens mount is a first mount and the eyeglass frame further comprises a second mount; and
    initially tracing the second mount at a starting tilting angle that is identical to an angle at which said tracing of the remainder of the first mount is completed.

20. The method of claim 15, wherein said determining of the delta Z value is performed based on said tracing of between about 80 degrees and about 180 degrees of the lens mount.

* * * * *